United States Patent Office 2,979,672
Patented Apr. 11, 1961

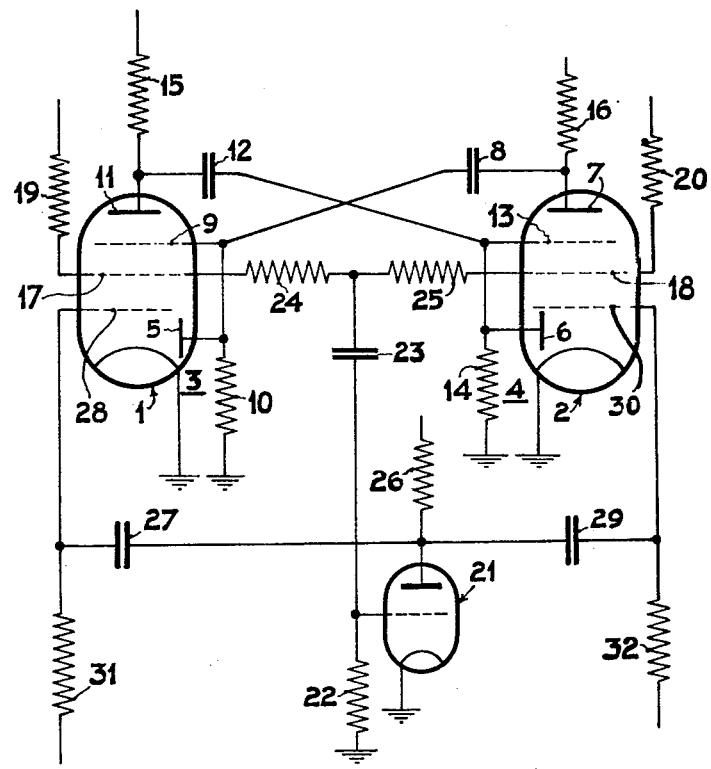

2,979,672

TRIGGER CIRCUIT ARRANGEMENT

Willem D. Meewezen, Torrens Park, South Australia, assignor to North American Philips Company, Inc., New York, N.Y., a corporation of Delaware Filed Aug. 20, 1957, Ser. No. 679,233

Claims priority, application Australia May 21, 1957

4 Claims. (Cl. 331—145)

The present invention relates to a trigger circuit arrangement. More particularly, the invention relates to a trigger circuit arrangement controlled by a control-voltage and comprising at least two pentodes cutting off one another by relative feedback, the two tubes of the trigger being simultaneously cut off periodically by means of rectangular switching pulses. Each time at the occurrence of a trailing edge of a switching pulse and in accordance with the control voltage being higher or lower as compared with a given reference voltage, one or the other pentode of the trigger changes over into the conductive state.

Devices of the kind described above have the advantage that they have a particularly high response sensitivity. In practical, reliable embodiments of these devices the control-voltage difference required for changing-over the trigger into different directions, i.e. the response sensitivity, lies at about 0.01 volt.

Such devices may be used in various ways. They may be used, for instance, for bilateral limitation or as non-linear amplifiers of a control-voltage supplied to the control grid of one of the pentodes or for pulse regeneration in telegraph receivers.

The invention has for its object to simplify devices of the type described while maintaining the advantageous properties thereof.

In accordance with the invention, the anodes and the suppressor grids of the pentodes are, to this end, relatively coupled cross-wise and the suppressor grids of the pentodes are, moreover, connected to the anodes of diodes connected between the suppressor grids and the cathodes of the pentodes. The circuit arrangement further comprises an auxiliary tube to produce the switching pulses, the control grid of which is coupled via a capacitative coupling with the screen grid of each of the pentodes, and the anode of which is connected via a capacitative coupling to the control grid of each of the pentodes.

By employing the invention a separate switching pulse generator to produce the switching pulses may be dispensed with.

In order that the invention may be readily carried into effect, it will now be described more fully with reference to the accompanying drawing, wherein the single figure is a schematic diagram of an embodiment of the circuit arrangement of the present invention.

The single figure shows in detail an embodiment of the device of the invention, in which use is made of two pentodes 1 and 2, connected to form a trigger which is controlled by a control voltage whereby both said pentodes are cut off simultaneously periodically by means of switching pulses. Each of the pentodes comprises a diode 3 and 4, respectively, of which the anodes are designated by 5 and 6, respectively, and of which the cathodes are constituted by the cathodes of the pentodes 1 and 2. The tubes are connected as follows. The anode 7 of the pentode 2 is coupled with the suppressor grid 9 of the pentode 1 via a capacitor 8. The suppressor grid 9 is connected to the anode 5 of the diode 3 contained in the pentode 1 and to ground via the resistor 10. In a similar manner, the anode 11 of pentode 1 is connected via a capacitor 12 to the suppressor grid 13 of pentode 2 and to the anode 6 of the diode 4 contained in the pentode 2, the anode of said diode being connected to ground via a resistor 14. The anodes of the pentodes 1 and 2 are fed via resistors 15 and 16 from a source of anode voltage (not shown), while the cathodes of these tubes and the negative terminal of the anode voltage source are connected to ground. The screen grids 17 and 18 of pentodes 1 and 2 are fed via identical resistors 19 and 20, respectively, from the source of anode voltage. In order to produce the switching pulses for periodically cutting off simultaneously the pentodes 1 and 2 the circuit arrangement further comprises an auxiliary tube, constituted by a triode 21. The control grid of triode 21 is connected to ground via a resistor 22 and to the common connecting point of two identical resistors 24 and 25 via a capacitor 23, these resistors connecting to one another the screen grids 17 and 18 of the pentodes 1 and 2. The anode of the triode 21 is connected on the one hand via the resistor 26 to the positive terminal of the anode voltage source and on the other hand via a capacitor 27 to the control grid 28 of the pentode 1 and via a capacitor 29 to the control grid 30 of the pentode 2, while the cathode is connected to ground.

A control voltage and a suitable grid bias voltage are supplied to the control grid 28 of the pentode 1 via a resistor 31, and a reference voltage is supplied to the control grid 30 of pentode 2 via a resistor 32.

The pentodes 1 and 2 constitute together a trigger circuit, while each of said pentodes, together with the triode 21, also constitutes a trigger circuit. The circuit arrangement is proportioned to be such that the time constant of the trigger formed by the pentodes 1 and 2 is high compared with the time constants of the triggers formed by the tubes 1 and 21 and 2, 21, respectively.

The circuit arrangement described above operates as follows. It is assumed that at the beginning, the control grid 28 of the pentode 1 is slightly more positive than the control grid 30 of the pentode 2; then the anode current of the pentode 1 exceeds the anode current of pentode 2 and accordingly the anode voltage of pentode 1 drops below that of pentode 2. This anode voltage drop in pentode 1 is transferred to the suppressor grid 13 of pentode 2, so that the anode current of pentode 2 is further reduced. The resultant increase in anode voltage of pentode 2 is transferred to the suppressor grid 9 of pentode 1 and produces a further increase in anode current in pentode 1. Due to the known trigger effect, when pentode 1 draws current, pentode 2 will consequently be cut off, whereas, in a similar manner, when pentode 2 draws current, pentode 1 will be cut off.

An increase in anode current in pentode 1 produces a drop in screen grid voltage in this tube, this drop being transferred to the control grid of triode 21, via the resistor 24 and the capacitor 23. Triode 21 is thus cut off, similar to pentode 2.

After a period of time corresponding to the time constant of the trigger 1, 21, the triode 21 changes over from the cut off condition into the current conducting condition, the voltage drop occurring at the anode of the triode 21 being transferred to the control grids of the pentodes 1 and 2, so that the latter are both cut off.

Due to the trigger effect between the tubes 1 and 21 or 2 and 21, a negative switching pulse occurs at the anode of the tube 21 with a periodicity determined by the time constant of the trigger circuit concerned, so that the two pentodes 1 and 2 are simultaneously cut off periodically. In the cut-off condition the anode voltages of the two pentodes are equal and the diodes 5 and 6, housed in the pentodes, draw current, so that the suppressor grids of the two pentodes connected to ground also have equal potentials. Any residual voltages are thus avoided so that there is a favorable effect on the response sensitivity.

During the occurrence of the trailing edge of the negative switching pulse that one of the two pentodes 1 and 2 will start to draw current which obtains the highest voltage from outside. Thus, when the control voltage supplied to the control grid of pentode 1 exceeds the reference voltage supplied to the control grid of pentode 2, the pentode 1 will draw anode current, whereas the pentode 2 will not draw anode current due to the cut-off via the suppressor grid 13.

If the level of the control voltage is lower than the reference voltage, so that the control grid of pentode 2 has a higher positive voltage than the control grid of pentode 1, the anode current of pentode 1 will be cut off and the pentode 2 will draw anode current.

Thus oscillations occur at the anode of pentode 1, when the level of the control voltage exceeds the reference voltage, whereas they occur at the anode of pentode 2, when the level of the control voltage is lower than the reference voltage.

While the invention has been described by means of a specific example in a specific embodiment, I do not wish to be limited thereto, for obvious modifications will occur to those skilled in the art without departing from the spirit and scope of the invention.

What is claimed is:

1. A circuit arrangement comprising first and second electron discharge tubes each having a cathode, an anode and an auxiliary anode positioned in operative proximity to said cathode and forming a diode therewith, means interconnecting said first and second tubes in feedback relationship to produce a first trigger circuit, a third electron discharge tube for producing switching pulses, means coupling said first and third tubes to produce a second trigger circuit, means coupling said second and third tubes to produce a third trigger circuit, means for applying a control voltage to one of said first and second tubes, means for applying a reference voltage to the other of said first and second tubes whereby upon the occurrence of the trailing edge of a switching pulse produced by said third tube said one tube becomes conductive when said control voltage exceeds said reference voltage in magnitude and said other tube becomes conductive when said reference voltage exceeds said control voltage in magnitude and both said first and second tubes are simultaneously made non-conductive by a switching pulse produced by said third tube, and means connecting said diodes with their associated tubes in a manner whereby when said first and second tubes are non-conductive the said diodes draw current.

2. A circuit arrangement comprising first and second pentodes each having a cathode, an anode, a control grid, a screen grid and a suppressor grid, means interconnecting said first and second pentodes in feedback relationship to produce a first trigger circuit, said interconnecting means comprising means coupling the anode of said first pentode to the suppressor grid of said second pentode and means coupling the anode of said second pentode to the suppressor grid of said first pentode, a triode for producing switching pulses having a cathode, an anode and a control grid, means coupling said first pentode and said triode to produce a second trigger circuit, said last-mentioned coupling means comprising a first capacitor, means coupling the control grid of said triode to the screen grid of said first pentode through said first capacitor, a second capacitor and means coupling the anode of said triode to the control grid of said first pentode through said second capacitor, means coupling said second pentode and said triode to produce a third trigger circuit, said last-mentioned coupling means comprising means coupling the control grid of said triode to the screen grid of said second pentode through said first capacitor, a third capacitor and means coupling the anode of said triode to the control grid of said second pentode through said third capacitor, means for applying a control voltage to the control grid of said first pentode, and means for applying a reference voltage to the control grid of said second pentode whereby upon the occurrence of the trailing edge of a switching pulse produced by said triode said first pentode becomes conductive when said control voltage exceeds said reference voltage in magnitude and said second pentode becomes conductive when said reference voltage exceeds said control voltage in magnitude and both said pentodes are simultaneously made non-conductive by a switching pulse produced by said triode.

3. A circuit arrangement comprising first and second pentodes each having a cathode, an anode, a control grid, a screen grid, a suppressor grid and an auxiliary anode positioned in operative proximity to said cathode and forming a diode therewith, means interconnecting said first and second pentodes in feedback relationship to produce a first trigger circuit, said interconnecting means comprising means coupling the anode of said first pentode to the supressor grid of said second pentode and means coupling the anode of said second pentode to the suppressor grid of said first pentode, a triode for producing switching pulses having a cathode, an anode and a control grid, means coupling said first pentode and said triode to produce a second trigger circuit, said last-mentioned coupling means comprising a first capacitor, means coupling the control grid of said triode to the screen grid of said first pentode through said first capacitor, a second capacitor and means coupling the anode of said triode to the control grid of said first pentode through said second capacitor, means coupling said second pentode and said triode to produce a third trigger circuit, said last-mentioned coupling means comprising means coupling the control grid of said triode to the screen grid of said second pentode through said first capacitor, a third capacitor and means coupling the anode of said triode to the control grid of said second pentode through said third capacitor, said first trigger circuit having a high time constant relative to the time constants of said second and third trigger circuits, means for applying a control voltage to the control grid of said first pentode, means for applying a reference voltage to the control grid of said second pentode whereby upon the occurrence of the trailing edge of a switching pulse produced by said triode said first pentode becomes conductive when said control voltage exceeds said reference voltage in magnitude and said second pentode becomes conductive when said reference voltage exceeds said control voltage in magnitude and both said pentodes are simultaneously made non-conductive by a switching pulse produced by said triode, and means connecting said diodes with their associated pentodes in a manner whereby when said first and second pentodes are non-conductive the said diodes draw current, said last-mentioned connecting means comprising means connecting the suppressor grid of said first pentode to the auxiliary anode thereof and means connecting the suppressor grid of said second pentode to the auxiliary anode thereof.

4. A trigger circuit arrangement comprising first and second pentodes each having a cathode, an anode, a control grid, a screen grid, a suppressor grid and an auxiliary anode positioned in operative proximity to said cathode, means coupling the anode of said first pentode to the suppressor grid of said second pentode, means coupling the anode of said second pentode to the suppressor grid of said first pentode, means connecting the suppressor grid of said first pentode to the auxiliary anode thereof, means connecting the suppressor grid of said second pentode to the auxiliary anode thereof, first and second resistors of substantially equal resistance value, means for applying a positive voltage to the screen grid of said first pentode through said first resistor, means for applying a positive voltage to the screen grid of said second pentode through said second resistor, third and fourth resistors of substantially equal resistance value, means coupling the screen grids of said first and second pentodes to each other through said third and fourth resistors, a triode for producing switching pulses having a cathode, and anode and a control grid, a first capacitor, means coupling the control grid of said triode to a common point intermediate said third and fourth resistors through said first capacitor, second and third capacitors of substantially equal capacitance value, means coupling the anode of said triode to the control grid of said first pentode through said second capacitor, means coupling the anode of said triode to the control grid of said second pentode through said third capacitor, means for applying a control voltage to the control grid of said first pentode, and means for applying a reference voltage to the control grid of said second pentode whereby upon the occurence of the trailing edge of a switching pulse produced by said triode said first pentode becomes conductive when said control voltage exceeds said reference voltage in magnitude and said second pentode becomes conductive when said reference voltage exceeds said control voltage in magnitude and both said pentodes are simultaneously made non-conductive by a switching pulse produced by said triode.

References Cited in the file of this patent

UNITED STATES PATENTS

| | | |
|---|---|---|
| 2,106,342 | Doba | Jan. 25, 1938 |
| 2,569,827 | Paulsen | Oct. 2, 1951 |
| 2,593,452 | Hoeppner | Apr. 22, 1952 |
| 2,605,402 | Coleman | July 29, 1952 |
| 2,644,886 | Holland | July 7, 1953 |
| 2,647,208 | De Jager | July 28, 1953 |
| 2,695,962 | Nibbe | Nov. 30, 1954 |
| 2,748,272 | Schrock | May 29, 1956 |
| 2,777,067 | Higby | Jan. 8, 1957 |
| 2,782,306 | Dickinson | Feb. 19, 1957 |

FOREIGN PATENTS

| | | |
|---|---|---|
| 587,704 | Great Britain | Jan. 21, 1947 |